United States Patent [19]
Wyss

[11] Patent Number: 5,625,381
[45] Date of Patent: Apr. 29, 1997

[54] CONTROL ELEMENT CONSTITUTING A MOUSE

[75] Inventor: Peter Wyss, Thun, Switzerland

[73] Assignee: Comadur S.A., Le Locle, Switzerland

[21] Appl. No.: 832,342

[22] Filed: Feb. 7, 1992

[30] Foreign Application Priority Data

Feb. 12, 1991 [CH] Switzerland ............... 432/91

[51] Int. Cl.⁶ ........................................ G09G 3/02
[52] U.S. Cl. ............................... 345/163; 345/164
[58] Field of Search ................. 250/221; 74/471 XY; 345/163–167

[56] References Cited

U.S. PATENT DOCUMENTS

| | | | |
|---|---|---|---|
| 4,404,865 | 9/1983 | Kim | 340/710 X |
| 4,562,347 | 12/1985 | Hovey et al. | 250/221 |
| 4,801,931 | 1/1989 | Schmidt | 340/710 |
| 4,951,034 | 8/1990 | Mazzone et al. | 74/471 XY |
| 4,952,919 | 8/1990 | Nippoldt | 340/710 |
| 5,008,528 | 4/1991 | Duchon | 250/221 |
| 5,122,654 | 6/1992 | Koh et al. | 340/710 X |

FOREIGN PATENT DOCUMENTS

| | | |
|---|---|---|
| 3320057 | 12/1984 | Germany . |
| 2154306 | 2/1984 | United Kingdom . |

*Primary Examiner*—Ulysses Weldon
*Attorney, Agent, or Firm*—Griffin, Butler, Whisenhunt & Kurtossy

[57] ABSTRACT

A control element constituting a mouse designed to be connected to a cursor visualization assembly comprises:
  a housing;
  a mobile ball protruding outside the housing, to be actuated by a user;
  a support device adapted to receive said mobile ball, this support device having at least three bearings which are angularly offset and which comprise contact members of a material having a low coefficient of friction on which said mobile ball rests, wherein this control element has contact members cooperating with said ball by rolling friction.

4 Claims, 2 Drawing Sheets

CONTROL ELEMENT CONSTITUTING A MOUSE

The invention relates to a control element, particularly intended to be associated with a cursor visualization assembly, for example to control the position of a cursor on the screen of a computer monitor. A control element of this type is generally known as a mouse.

DESCRIPTION OF THE PRIOR ART

Control elements of this type are already known in the form a fixed or moveable mouse. A fixed mouse of this type is for example sold by Logitech under the trademark "Trackmann". This control element comprises a housing and a moveable ball protruding outside the housing to be actuated by the hand of a user.

In this design, the ball rests on three bearings that are angularly offset in relation to one another and which comprise contact members of a material having a low coefficient of friction, in this case of corundum.

BACKGROUND OF THE INVENTION

These contact members are in the form of spherical domes having a planar base surface, by means of which they are each bonded in a seating disposed for this purpose in each bearing so that the highest point of the domes protrudes from said bearings.

The design of this control element is not entirely satisfactory.

A first disadvantage is that it is difficult to bond the dome-shaped contact members automatically because of the small size of the parts in question (about 2.5 mm). This bonding therefore has to be done manually, thereby increasing production costs.

A second disadvantage is that it is difficult, during bonding to ensure the reproducibility of the distance between the base of the seating which receives the dome and the highest point thereof which makes contact with the ball because it is impossible during manual bonding to deposit a film of adhesive of constant thickness between the base of the dome and the base of the seating. As a result, the ball is poorly positioned and is in danger of rubbing directly against one of the bearings which is not adapted to come into direct contact therewith. This fault leads to premature wear on the ball and, in the longer term, to impaired operation of the control element.

It has moreover been observed that the mere rubbing of the ball against the contact members, even in normal operation, leads to rapid wear on the ball which necessitates its replacement at regular intervals.

OBJECTS OF THE INVENTION

It is therefore an object of the invention to overcome these disadvantages by providing a control element in which the contact members can be fitted automatically in their respective bearings in a reproducible manner thereby ensuring good positioning of the ball and, consequently, correct operation of the control element.

BRIEF DESCRIPTION OF THE INVENTION

The object of the invention is therefore a control element constituting a mouse designed to be associated to a cursor visualization assembly comprising:

a housing, a mobile ball protruding outside a housing to be actuated directly or indirectly by the user, a support device adapted to receive the ball and having at least three bearings which are angularly offset and which comprise contact men,bets of a material having a low coefficient of friction on which, said ball rests, wherein the contact members cooperate with said ball by rolling friction.

The rolling friction of the ball on the contact members substantially reduces the wear of the ball which is generally made of a material that is less hard than the contact members, thereby increasing the reliability and longevity of the control element.

According to a special embodiment of the invention the contact members are composed of ball-bearings freely pivotally mounted in the above-mentioned bearings.

More specifically, each ball-bearing is engaged in a seating provided in one of said bearings.

The contact members shaped like ball-bearings can easily be automatically positioned by machine, thereby reducing manufacturing time and increasing manufacturing reproducibility.

BRIEF DESCRIPTION OF THE DRAWINGS

The invention will be better understood from a study of the following detailed description with reference to the appended drawings which are given solely by way of example in which.

DETAILED DESCRIPTION OF THE INVENTION

Figure 1:
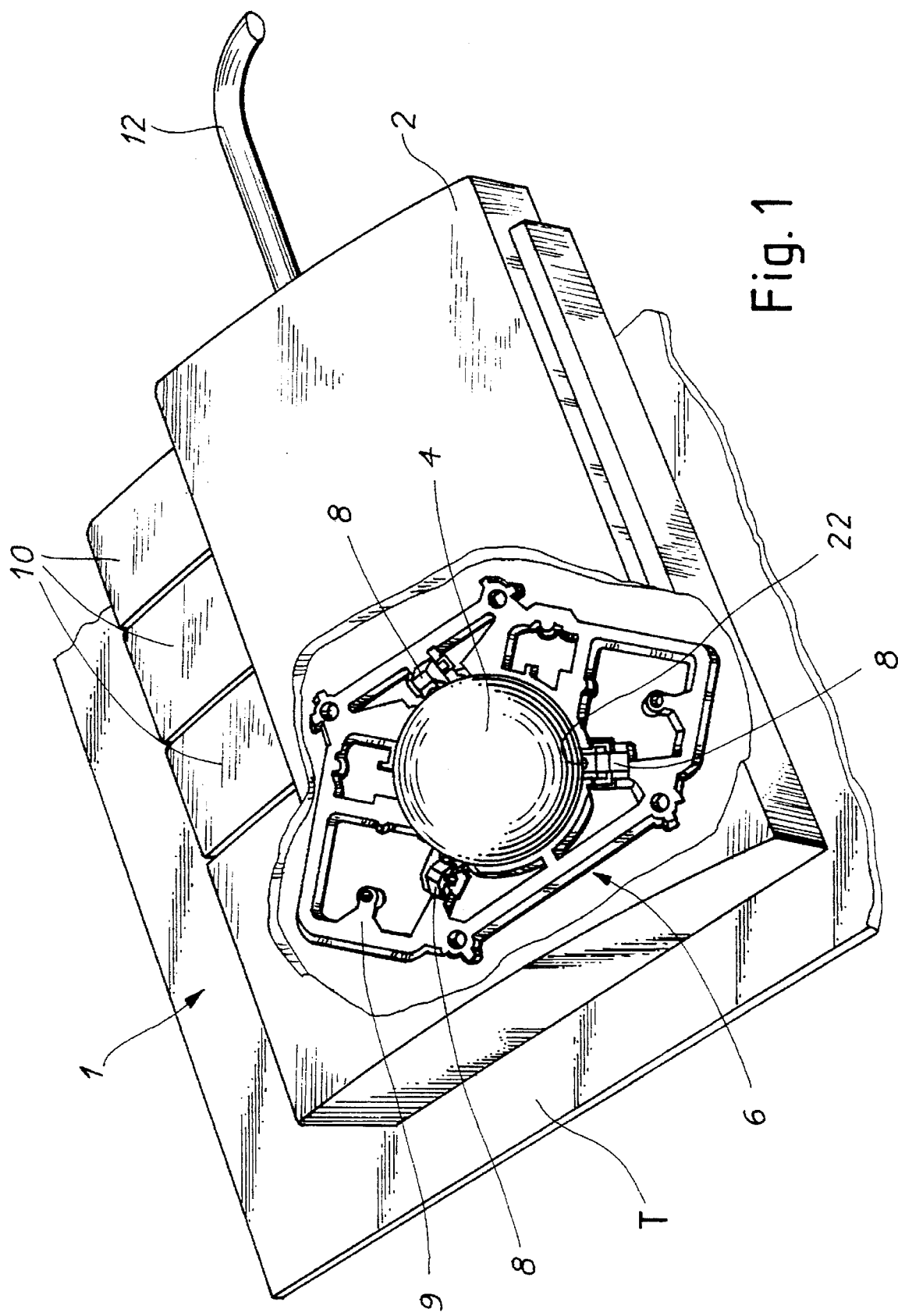
FIG. 1 shows a partially exploded perspective view of a control element of the invention.

FIG. 1 shows a control element of the invention bearing the general reference 1.

This control element 1 is designed to be associated with a cursor visualization assembly, not shown, generally referred to as a mouse.

In the embodiment shown in FIG. 1, the control element 1 is firmly mounted on a work surface T, such as a table or the like.

The control element 1 has a housing 2 substantially parallelipipedal in shape in which is lodged a mobile ball 4 which protrudes outside the housing 1 to be directly actuated by a user (not show). The control element 1 also has a support device 6 adapted to receive the mobile ball 4.

Figure 2:
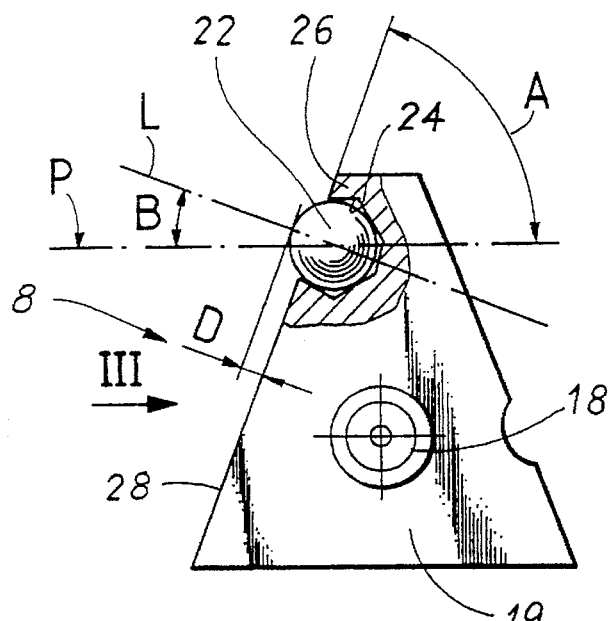
FIG. 2 shows a partially sectional lateral view of a bearing designed to equip the control element of the invention.
Figure 3:
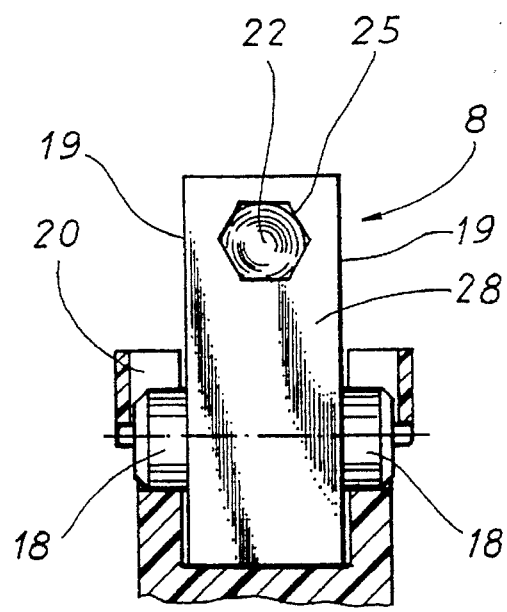
FIG. 3 is a view along the arrow III of FIG. 2.

The support device 6 in this example has three bearings 8 extending from a shoulder 9 of moulded plastic material. These bearings 8, which are shown in greater detail in FIGS. 2 and 3, are angularly offset with respect to each other. In this example the bearings 8 are offset by 120° around the mobile ball 4.

The housing 2 also has control keys 10 designed, for example, to supply a validation signal of a control pointed on a screen by a cursor piloted by the mobile ball 4 (not shown).

The housing 2 is connected to the visualization assembly, riot shown, by a connection cable 12.

It should be noted that other functional elements of the housing 2 have deliberately been omitted from FIG.1 to make the drawings clearer. Some of these elements are shown diagrammatically by functional blocks in FIG. 4.

As shown in this figure, the mobile ball 4 which is shown from above rests on bearings 8 of the support device 6 (FIG.

1). The mobile ball 4 cooperates with transducer means 14 which are sensitive to displacement of the mobile ball 4 and which are capable of supplying an electronic treatment circuit 16 with signals representing the movement of the ball.

The transducer means 14 as well as the treatment circuit 16 constitute means capable of transforming the movement of the mobile ball 4 into an electrical signal S that can be used by the visualization assembly, not shown.

Figure 4:
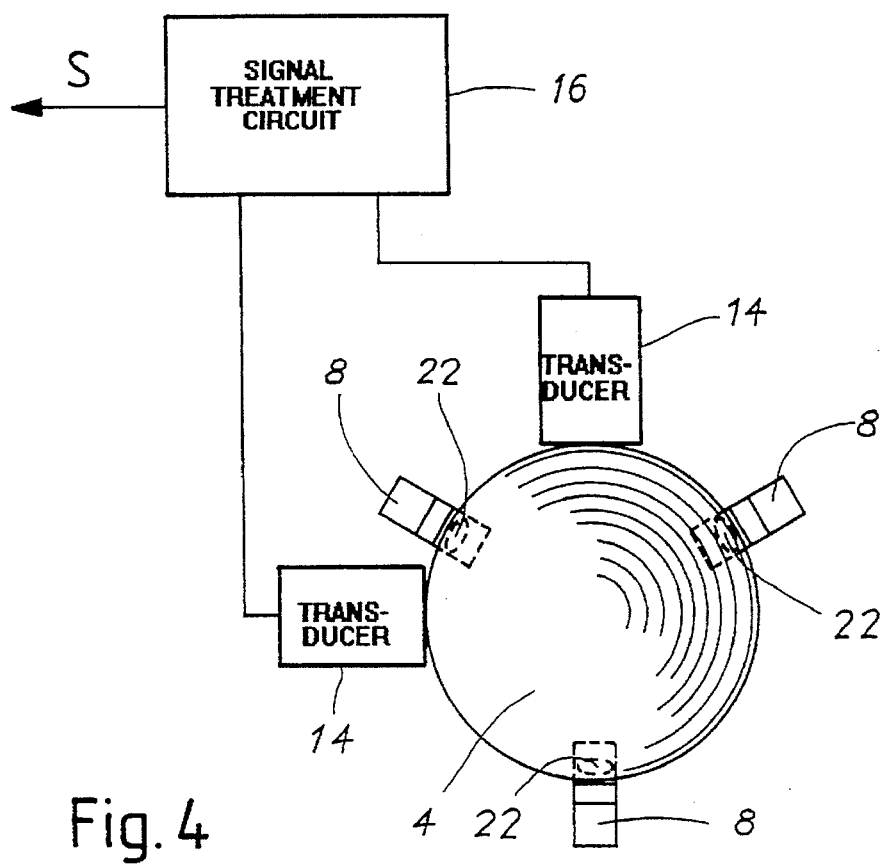
FIG. 4 is a view from above of a ball of the control element of FIG. 1, this ball resting on three bearings and cooperating with the electronic means for transforming the movement of the ball into an electrical signal.

Referring more specifically to FIGS. 2 and 3, these show in greater detail one of the bearings 8 shown in FIGS. 1 and 4.

Each bearing 8 has a pair of male engaging members 18 adapted to engage in female engaging members 20 integral with the shoulder 9 of the support device 6.

Each bearing 8 is thus firmly maintained in position on the support device 6.

The male engaging members 18 are composed respectively of two studs which respectively protrude laterally from two opposing faces 19 of the bearing 8 to resiliently engage in walls 20 extending from the shoulder 9 of the support device 6. The male 18 and female 20 engaging members will not be described in greater detail here since their manufacture is known to the person skilled in the art.

Each bearing 8 also has a contact member 22 made of a material having a low coefficient of friction and on which the mobile ball 4 shown in FIG. 2 rests. Each contact member 22 is composed of a ball-bearing freely pivotally mounted in a seating 24 provided in an upper part of the bearing 8.

It will be understood that the mobile ball 4 cooperates with each contact member 22 by a rolling friction, thereby considerably reducing wear on the mobile ball 4.

Each ball-bearing 22 which forms a contact member is engaged in the seating 24. More specifically, each bearing 8 has resilient engaging means 26 capable of retaining each ball-bearing 22 in its corresponding seating 24. The engaging means 26 have a recessed edge extending at least partially over the periphery of the seating 24. It should be noted that the seating 24 is shaped in such a way that the ball-bearing 22, when engaged in its seating 24, protrudes outside the seating 24 at the outside of the bearing 8. The recessed edge 26 which forms the engaging means is composed of a continuous lip extending to the periphery of the opening 25 of the seating 24. The dimensions of the opening 25 are substantially less that the diameter of the ball-bearing 22 and the lip 26 has sufficient resilient deformation properties to become deformed during engagement of the ball-bearing 22 and to resume its initial shape in order to maintain the ball-bearing 22 in position after it has been engaged.

For this purpose, each bearing 8 is made of a material having resilient deformation characteristics greater than those of the ball-bearing and, preferably, each bearing 8 is made of a material such as polyoxymethylene, commonly referred to by the initials POM, whereas the ball-bearings are made of corundum.

Considering that the assembly of three ball-bearings 22 defines a geometric plane, symbolized by the line P in FIG. 2, it will be seen that the seatings 24 are provided in a planar surface of the bearings 8 inclined at an angle A comprising between 60° and 75° in relation to the geometric plane P. It will also be noted that the axis L of revolution of each seating forms an angle B comprising 10° and 30° with said geometrical plane P.

Preferably, and as is shown in the example described, the angle A substantially equals 69° and the angle B substantially equals 19°.

Various experiments have determined that the choice of these two angles A, B, constituted an interesting compromise in respect of the functioning of the control element and in particular of the mobility of the ball on the bearings.

It should be noted that in another embodiment, not shown, the mobile ball 4 as well as the support device 6 are integrated in a computer keyboard, not shown.

In yet another embodiment, not shown, this action can be integrated in a mobile mouse, where the ball which is indirectly actuated by the user by the intermediary of the housing, rests on the working surface.

The actuation of the control element according to the invention makes it possible to automate the positioning of the contact members 22 inside corresponding bearings 8 and, consequently, it makes it possible to provide control elements in which the distance D, on which the ball-bearing 22 protrudes from each bearing is constant so that the mobile ball 4 of the control elements of the invention is perfectly positioned inside the housing 2 and does not cause premature wear on the ball and does not risk rubbing against one of the bearings 8.

I claim:

1. A control element constituting a mouse designed to be connected to a cursor visualization assembly and having:

a housing;

a mobile ball protruding outside said housing to be directly or indirectly actuated by a user;

a support device adapted to receive said mobile ball and having at least three bearings which are angularly offset and which comprise contact members of a material of low coefficient of friction on which said mobile ball rests, said contact members cooperating with said ball by a rolling friction and said contact members comprising ball-bearings freely supported for rotation in all directions, said ball-bearings defining a geometric plane (P) and said seatings being disposed in a surface of the bearing inclined at an angle (A) comprising between 60° and 75° in relation to said geometric plane (P).

2. A control element according to claim 1 wherein the angle (A) is substantially equal to 69°.

3. A control element constituting a mouse designed to be connected to a cursor visualization assembly and having:

a housing;

a mobile ball protruding outside said housing to be directly or indirectly actuated by a user;

a support device adapted to receive said mobile ball and having at least three bearings which are angularly offset and which comprise contact members of a material of low coefficient of friction on which said mobile ball rests, said contact members cooperating with said ball by a rolling friction and said contact members comprising ball-bearings freely supported for rotation in all directions, each ball-bearing being engaged in a seating provided in each of the bearings, said ball-bearings defining a geometric plane (P) and the longitudinal axis of revolution of each seating forming an angle (B) comprising between 10° and 30° with said geometric plane.

4. A control element according to claim 2 wherein the angle (B) is substantially equal to 19°.

* * * * *